United States Patent [19]

Yoshinaga et al.

[11] Patent Number: 5,258,134
[45] Date of Patent: Nov. 2, 1993

[54] MAIN CHAIN-TYPE CHIRAL SMECTIC POLYMER LIQUID CRYSTAL AND POLYMER LIQUID CRYSTAL DEVICE

[75] Inventors: Kazuo Yoshinaga, Machida; Yutaka Kurabayashi, Yokohama; Koichi Sato; Takeo Eguchi, both of Atsugi; Yomishi Toshida, Yokohama, all of Japan

[73] Assignee: Canon Kabushiki Kaisha, Tokyo, Japan

[21] Appl. No.: 459,271

[22] Filed: Dec. 29, 1989

[30] Foreign Application Priority Data

Dec. 30, 1988 [JP] Japan .................. 63-334237
Dec. 27, 1989 [JP] Japan .................. 1-336249

[51] Int. Cl.⁵ ............... C09K 19/52; C09K 19/06; G02F 1/13
[52] U.S. Cl. ............... 252/299.01; 252/299.6; 252/299.66; 252/299.67; 359/104
[58] Field of Search .............. 252/299.01, 299.67, 252/299.66, 299.6; 350/350 R, 350 S; 359/104

[56] References Cited

U.S. PATENT DOCUMENTS

| | | | |
|---|---|---|---|
| 4,367,924 | 1/1983 | Clark et al. | 350/334 |
| 4,844,835 | 7/1989 | Uchida et al. | 252/299.01 |
| 4,892,675 | 1/1990 | Nohira et al. | 252/299.01 |
| 4,943,387 | 7/1990 | Furukawa et al. | 252/299.67 |
| 4,965,591 | 10/1990 | Kurabayashi et al. | 346/108 |

FOREIGN PATENT DOCUMENTS

| | | |
|---|---|---|
| 136725 | 4/1985 | European Pat. Off. |
| 292244 | 11/1988 | European Pat. Off. |
| 107216 | 8/1981 | Japan |
| 090290 | 5/1985 | Japan |
| 122471 | 6/1987 | Japan |
| 072784 | 4/1988 | Japan |

OTHER PUBLICATIONS

Clark et al., App. Phys. Lett., vol. 36, No. 11, (1980), 899:901.
Shibaev et al., Polymer Comm., vol. 24, (1983), 364:5.

Primary Examiner—Richard D. Lovering
Assistant Examiner—Shean C. Wu
Attorney, Agent, or Firm—Fitzpatrick, Cella, Harper & Scinto

[57] ABSTRACT

A chiral smectic main chain-type polymer liquid crystal includes mesogen units and a flexible chain group connecting the mesogen units having a length equal to or longer than 1,4-butylene group. The polymer liquid crystal is also characterized by having at least two units having mutually different optically active groups and having at least two recurring units which show mutually reverse helical rotations in its chiral smectic phase. Because of these features, the polymer liquid crystal can show an improved responsiveness because of its chiral smectic ferroelectricity based on an elongated helical pitch while retaining a good film-formability of a main chain-type polymer liquid crystal.

16 Claims, 2 Drawing Sheets

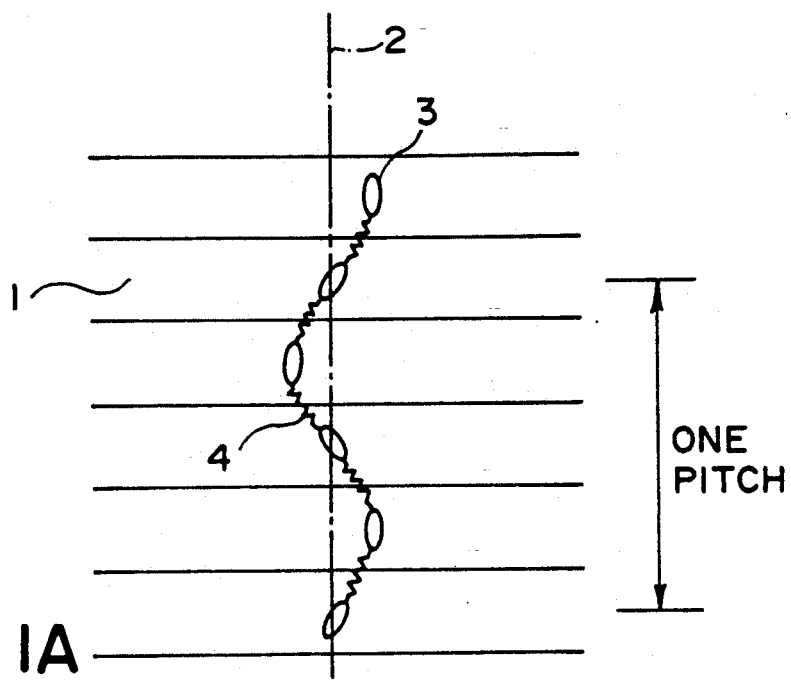
FIG. IA
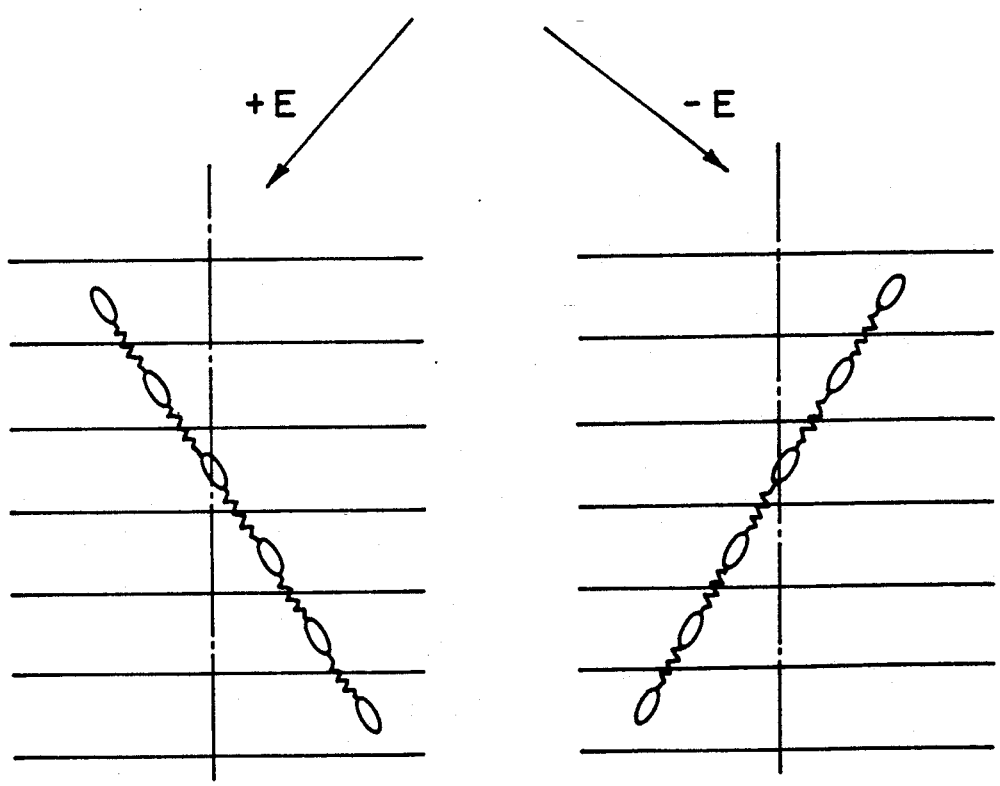
FIG. IB   FIG. IC

MAIN CHAIN-TYPE CHIRAL SMECTIC POLYMER LIQUID CRYSTAL AND POLYMER LIQUID CRYSTAL DEVICE

FIELD OF THE INVENTION AND RELATED ART

The present invention relates to a main chain-type chiral smectic polymer liquid crystal comprising an optically active mesomorphic polymer and a polymer liquid crystal device using the same.

Hitherto, as a liquid crystal display system, there has been frequently used a TN (twisted nematic)-type of liquid crystal devices. This type of liquid crystal devices has advantageous features, such as a small power consumption, but on the other hand has a difficulty that the number of pixels is restricted because of a crosstalk during multiplexing drive with the use of a matrix electrode structure providing a high pixel density. Further, it is also accompanied with other difficulties, such as a slow electric field response and a poor viewing angle characteristic.

On the other hand, in order to improve the defects of conventional liquid crystal devices, Clark and Lagerwall have proposed the use of a ferroelectric liquid crystal showing bistability (Japanese Laid-Open Patent Application No. 107216/1981; U.S. Pat. No. 4,367,924, etc.). As the bistable liquid crystal, a ferroelectric liquid crystal showing chiral smectic C phase (SmC*) or H phase (SmH*) is generally used.

The ferroelectric liquid crystal is characterized by a quick electric field responsiveness and also an excellent viewing angle characteristic, so that it is expected to be applied to a liquid crystal device of a large capacity and a large area. In order to attain such bistability and high-speed responsiveness, it is necessary to unwind the helix or spiral of the chiral smectic phase by setting a cell gap d to be smaller than the helical pitch p of the liquid crystal (d≦p) as proposed by Clark, et al (N.A. Clark and S. T. Lagerwall, "Appl. Phys. Lett." 36, p. 899—(1980)). However, most ferroelectric liquid crystals known at present have a short helical pitch so that a small cell gap of 1-2 microns is required to unwind the helix. However, it is difficult to obtain a cell with a larger area while maintaining such a small cell gap.

As a method for solving the problem, it has been proposed to mix a low-molecular weight liquid crystal having a dextro-rotatory helix and a low-molecular weight liquid crystal having a levo-rotatory helix (Japanese Laid-Open Patent Appln. No. 90290/1985). According to this method, it is possible to provide a ferroelectric liquid crystal with a longer helical pitch without remarkably decreasing its spontaneous polarization. Even if such a long helical pitch is realized, however, a large-area liquid crystal device also requires formation of a uniform monodomain. For this purpose, an appropriate aligning treatment is applied to a liquid crystal device, but a large area liquid crystal device is liable to be accompanied with alignment defects due to spacers for giving a uniform cell gap. As a method for solving this problem, it is considered suitably to use a polymer liquid crystal having a good film-forming characteristic.

As an example of a liquid crystal display system using a polymer liquid crystal, it is possible to raise a polymer liquid crystal display device of a thermal writing-type as disclosed in Polymer Communications, Vol. 24, p.p. 364-365, "Thermotropic Liquid Crystalline Polymers 14" by V. Shibaev, S. Kostromin, N. Plate, and I. Yakovlev.

The above-described system, however, involves several problems, such as poor contrast because of the use of light scattering for readout and a delay in response accompanying the use of a polymer liquid crystal, so that it has not been put into practical use.

With respect to the defect of a slow response speed of the above-described polymer liquid crystal display, the use of a ferroelectric polymer liquid crystal has been tried as disclosed in Japanese Laid-Open Patent Appln. No. 72784/1988, whereby a considerably improved response speed has been attained compared with a conventional polymer liquid crystal.

Such a ferroelectric polymer liquid crystal is, however, still required to have a longer helical pitch in SmC* phase, when it is used to constitute a large-area display with a memory characteristic. In order to provide a polymer liquid crystal with an elongated helical pitch it has been proposed to mix a low-molecular weight liquid crystal with a reverse helical rotation direction as disclosed by, e.g., Japanese Laid-Open Patent Appln. No. 122471/1987, or to copolymerize a monomer having a reverse helical rotation with a side-chain type polymer liquid crystal (14th Liquid Crystal Forum, Preprint, p. 58 (1988) 1B112, H. Endo, K. Yuasa, K. Morita, S. Uchida, K. Hashimoto and K. Kawasaki).

However, a ferroelectric polymer liquid crystal containing a low-molecular weight liquid crystal can show a fairly high response speed but is accompanied with a defect that it can only provide a film having a strength which is considerably lower than that of the ferroelectric polymer liquid crystal alone. Further, a side chain-type polymer liquid crystal provided with an elongated helical pitch is insufficient in strength by nature and requires a complicated process for uniaxial alignment.

In respects of film formation and uniaxial alignment, a main chain-type ferroelectric polymer liquid crystal is preferred but it has been difficult to obtain a high-speed responsiveness by itself.

SUMMARY OF THE INVENTION

In view of the problems involved in conventional polymer liquid crystal materials and devices using the same, an object of the present invention is to provide a solution to a slow response speed of a conventional polymer liquid crystal, particularly to a slow response speed of a main chain-type ferroelectric mesomorphic polymer alone which is inherently excellent in film-forming characteristic and suitable for providing a large-area device.

A more specific object of the invention is to provide a main chain-type polymer liquid crystal which is easily formed into a film having a good strength, is suitable for providing a large-area device and has a high-speed responsiveness.

A further object of the present invention is to provide a polymer liquid crystal device using such a polymer liquid crystal.

According to a principal aspect of the present invention, there is provided a main chain-type chiral smectic polymer liquid crystal, comprising a main chain-type polymer liquid crystal which includes mesogen units connected with a flexible chain group having a length equal to or longer than 1,4-butylene group and at least two units having mutually different optically active groups, said polymer liquid crystal including at least two recurring units which show mutually reverse helical rotations in its chiral smectic phase.

According to the present invention, there is further provided a polymer liquid crystal device, comprising a film of the above main chain-type chiral smectic polymer liquid crystal and an electrode disposed on at least one side of the film.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1A is a schematic view of a conventional main chain-type ferroelectric polymer liquid crystal molecule, and FIGS. 1B and 1C are schematic view of the polymer liquid crystal molecule under different polarities of electric fields.

DETAILED DESCRIPTION OF THE INVENTION

Figure 2:
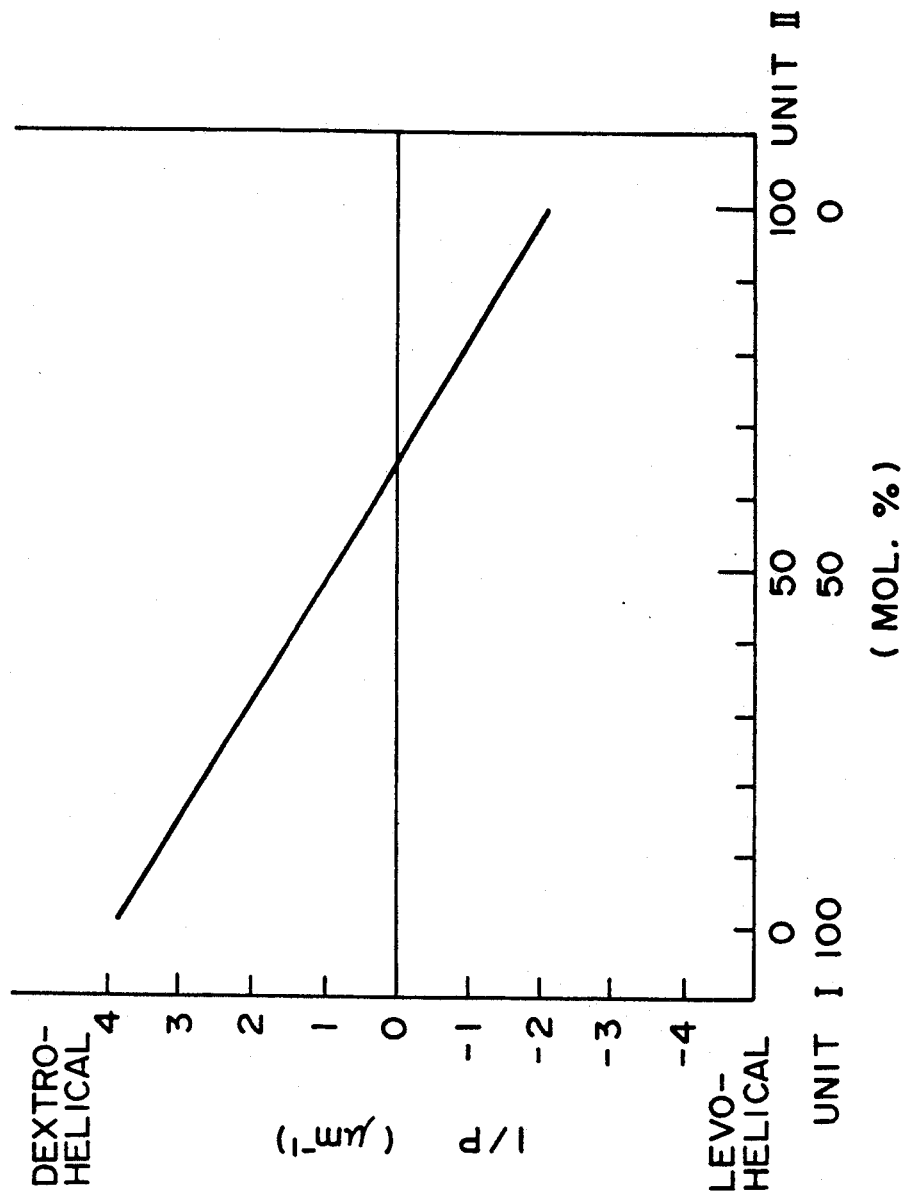
FIG. 2 is a graph showing a relationship between the helical pitch of a chiral smectic polymer liquid crystal and compositions of units I and II constituting the polymer liquid crystal according to Example 1 of the present invention.

As described above, the present invention provides a main chain-type polymer liquid crystal, particularly a main chain-type ferroelectric polymer liquid crystal, including mesogen units connected with a flexible chain having a length equal to or longer than 1,4-butylene group and also including at least two units having mutually different optically active groups. The polymer liquid crystal is further characterized by including two (or more) recurring units which show mutually reverse helical rotations. As a result, the main chain-type ferroelectric polymer liquid crystal is caused to have an elongated helical pitch, so that it is provided with a good alignment and an improved strength even when it is formed in a large-area film. Further, the polymer liquid crystal is also provided with an improved responsiveness.

FIGS. 1A-1C are schematic views illustrating a behavior in response to an electric field of a conventional main chain-type ferroelectric polymer liquid crystal. Referring to these figures, a conventional ferroelectric polymer liquid crystal in chiral smectic phase forms smectic layers 1 arranged with a normal 2 to the layers. Each molecule of the polymer liquid crystal has a polymer main chain comprising mesogen units 3 connected with flexible chains 4. A pair of the mesogen unit 3 and a flexible chain constitutes a recurring unit, which recurs while gradually twisting around a normal 2 to the smectic layers, thus forming a polymer main chain in the form of a helix extending through the smectic layers. Accordingly, in order to unwind the helical structure to uniformize the spontaneous polarization by application of an electric field, it is necessary that the polymer liquid crystal molecule causes a conformation change as a whole, so that the response speed becomes very slow.

According to the present invention, into a main chain-type chiral smectic polymer liquid crystal, a recurring unit of a mesomorphic polymer having a reverse helical rotation direction is introduced by copolymerization, etc., to elongate the helical pitch, whereby the principal molecular axis of the main chain-type ferroelectric polymer liquid crystal can coincide with a normal to the chiral smectic layers. As a result, the C-director can be switched not by a conformation change accompanied by a whole molecule movement but by a conformation change on the normal to the smectic layers, whereby the response speed can be remarkably increased.

The main chain-type chiral smectic polymer liquid crystal according to the present invention can show a good memory characteristic at a temperature above its glass transition temperature (Tg) and at a relative thickness not causing a surface stabilization. This is presumably because the polymer liquid crystal molecule extends through smectic layers in chiral smectic C phase so that it has an increased elastic constant and an increased alignment stability. This phenomenon has not been known at all with respect to a chiral smectic phase attained by conventional side chain-type polymer liquid crystal, low-molecular weight liquid crystal or mixture of low-molecular weight liquid crystal and polymer liquid crystal. As a result, according to the main chain-type chiral smectic polymer liquid crystal, not only the semi-permanent memory effect below Tg but also the above-mentioned novel memory effect and memory effect by stabilization can be utilized separately or in combination.

Further, the main chain-type chiral smectic polymer liquid crystal according to the present invention can have an elongated helical pitch by containing recurring units showing mutually reverse helical rotation directions. In order to align the polymer liquid crystal molecules sufficiently vertically to the chiral smectic layers to provide a device with a sufficiently improved response speed, the polymer liquid crystal may preferably be provided with a helical pitch of not shorter than 0.5 micron, further preferably not shorter than 1.0 micron.

The main chain-type chiral smectic polymer liquid crystal according to the present invention may comprise a mesomorphic polymer including a recurring unit represented by the following formula (1):

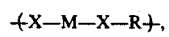

wherein M denotes a mesogen unit, R denotes an optically active flexible group, and X denotes a single bond or a bonding group.

The terms "mesogen unit", "flexible chain group", and "bonding group" are believed to be fairly well known in the art. Herein, the "mesogen unit" is specifically intended to mean a basic unit which provides the polymer liquid crystal with a liquid crystalline or mesomorphic nature and comprises at least two cyclic groups including two terminal cyclic groups.

The "bonding group" is a group connecting a mesogen group and a flexible chain group. Examples of the bonding group may include ester, ether, thioester and carbonate groups, among which the ester bond group is preferred because the resultant main chain is readily aligned on the normal and shows good alignment and response characteristics.

The term "flexible chain group" is intended to mean a linear or branched chain group which excludes the above-mentioned bonding group but can include an intermediate group such as an ester groups which can be classified as a bonding group when placed adjacent to a mesogen unit. The main chain of the flexible chain group may be composed of one or more of C, Si, O and S atoms. The polymer liquid crystal according to the present invention can partially include a linear or optically non-active chain group but is required to contain at least two different optically active units constituted by flexible chain groups. Such an optically active unit may be constituted by introducing a substituent of, e.g., a halogen atom, a cyano group, and a lower alkyl group (e.g., $C_1$-$C_4$) capable of having a substituent, such as a halogen, cyano or amino group, into the flexible chain group.

The polymer liquid crystal may comprise a molecular weight (in terms of the molecular weight of a corresponding polystyrene through measurement by GPC (gel permeation chromatography) of $10^3$-$10^6$, preferably $4 \times 10^3$-$4 \times 10^5$, further preferably $5 \times 10^3$-$10^5$. A polyester type mesomorphic polymer having a recurring unit of the following formula (2) and obtained by polycondensation of an optically active diol and a dicarboxylic acid as a mesogen is particularly preferred because of easiness in assuming chiral smectic phase and easiness in adjustment of copolymerization ratio:

(2)

Of course, such polyester-type mesomorphic polymers may also be suitably prepared by polycondensation through ester exchange.

The flexible chain groups (which may be optically active or optically inactive) in the main chain-type chiral smectic polymer liquid crystal of the present invention is required to be one having a length equal to or longer than 1,4-butylene group which is a $C_4$-linear olefin group having a length of about 5 Å between the two terminal carbon atoms. A flexible chain group having a length equal to or shorter than 1,3-propylene group which is a $C_3$-linear olefin group, fails to provide the desired effect of the present invention because relative positions of adjacent mesogen units are close to each other and lack in relative mobility even if different optically active groups are used to elongate the helical pitch. The flexible chain group is preferably one having a length equal to or longer than 1,6-hexylene group which is a $C_6$-linear olefin group, and it can be used with a group having a length corresponding to 1,4-butylene group to show a desirable effect.

Examples of the mesogen unit used in the main chain-type chiral smectic polymer liquid crystal may include the following:

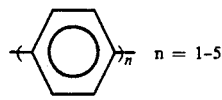
1 n = 1-5

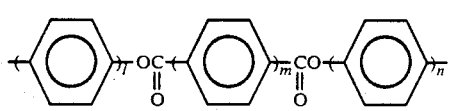
2 l, m, n = 1-3
l + m + n ≦ 5

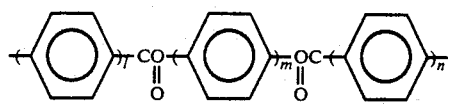
3 l, m, n = 1-3
l + m + n ≦ 5

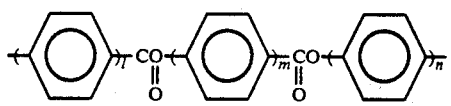
4 l, m, n = 1-3
l + m + n ≦ 5

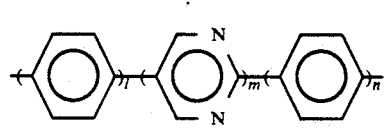
5 m = 1-2
l, n = 1-2
l, n = 0-2
1 ≦ l + n ≦ 4

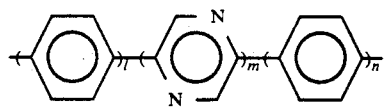
6 m = 1-2
l, n = 0-2
1 ≦ l + n ≦ 4

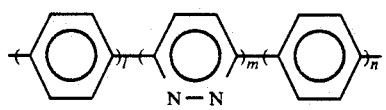
7 m = 1-2
l, n = 0-2
1 ≦ l + n ≦ 4

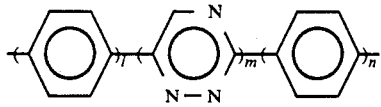
8 m = 1-2
l, n = 0-2
1 ≦ l + n ≦ 4

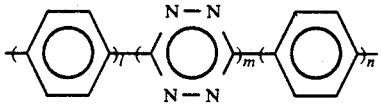
9 m = 1-2
l, n = 0-2
1 ≦ l + n ≦ 4

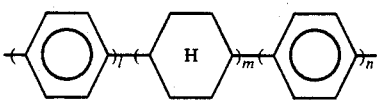
10 m = 1-3
l, n = 0-2
1 ≦ l + n ≦ 4

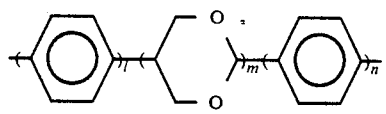

m = 1-2
l, n = 0-2
1 ≦ l + n ≦ 4

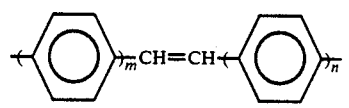

m, n = 0-3
2 ≦ m + n ≦ 4

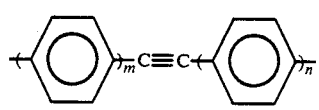

m, n = 0-3
2 ≦ m + n ≦ 4

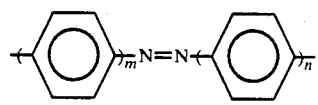

m, n = 1-2

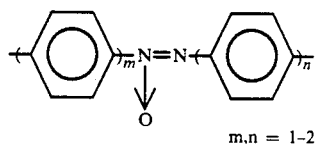

m, n = 1-2

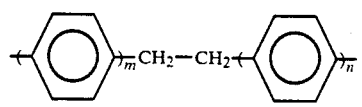

m, n = 1-2

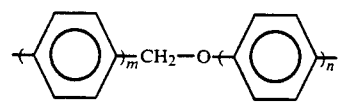

m, n = 1-2

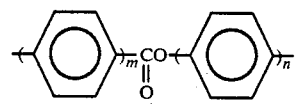

m, n = 1-3

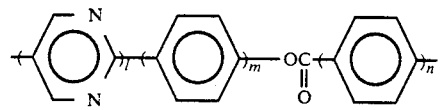

n, l = 1-2
m = 0-2

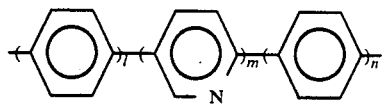

l, n = 0-2
m = 1-2
2 ≦ l + n ≦ 5

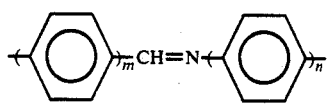

m, n = 1-2

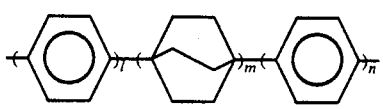

l, n = 0-2
m = 1-2
2 ≦ l + n ≦ 5

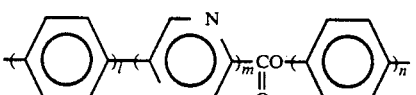

n, m = 1-2
l = 1-2

Then, examples of the optically active unit (combination of the optically active flexible chain group and the bonding group) may include the following (wherein Ps denotes a spontaneous polarization as measured by the triangular wave-application method):

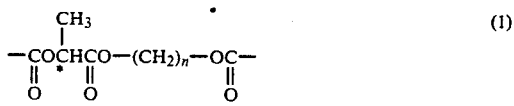

n = 2-18
Ps (+) Dextro-helical

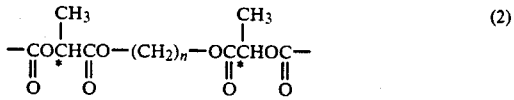

n = 2-18
Ps (+) Dextro-helical

n = 3-18
Ps (+) Levo-helical

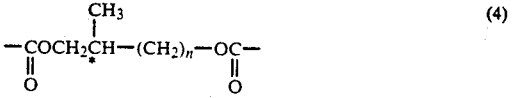

n = 2-18
Ps (−) Dextro-helical

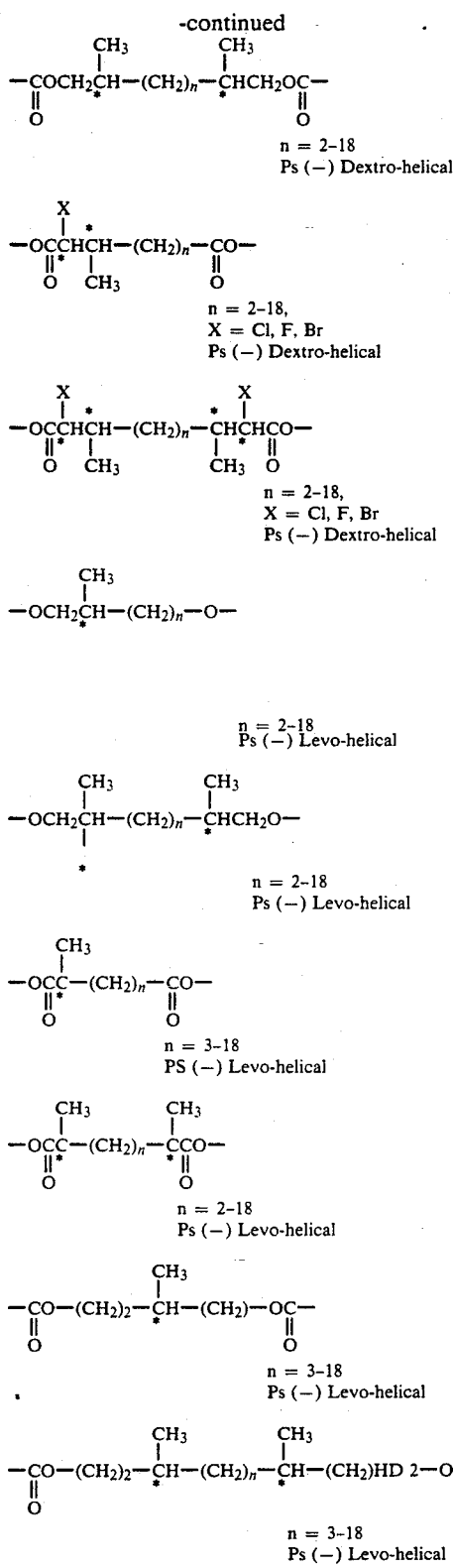

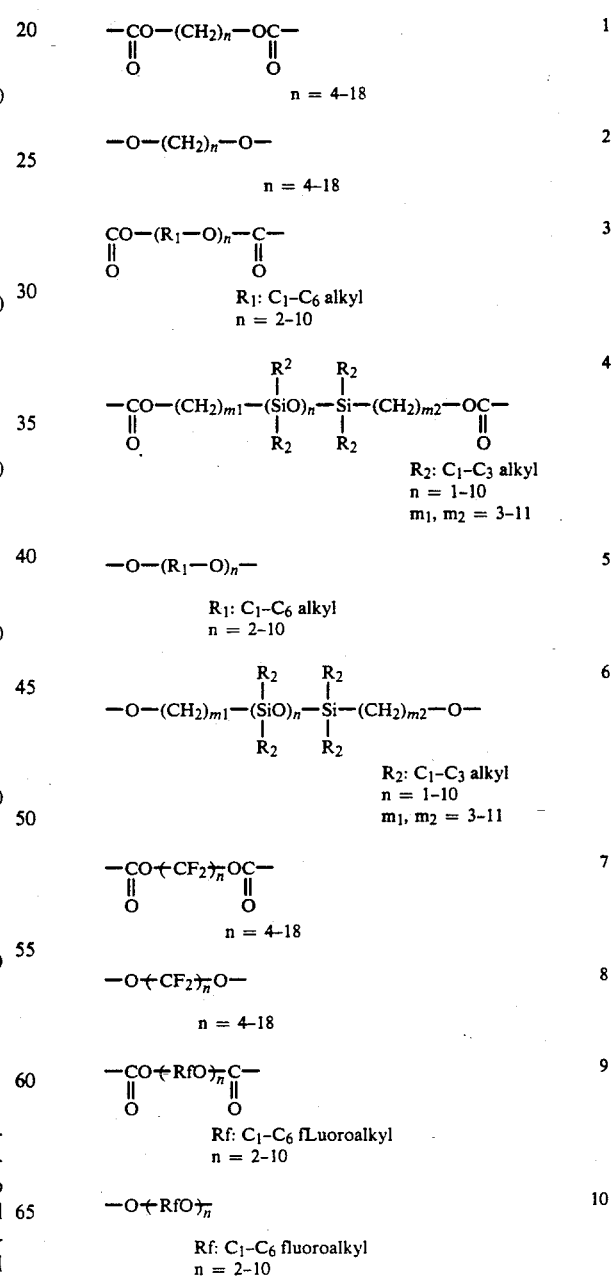

tal having an elongated helical pitch and an excellent alignment characteristic may be obtained.

It is particularly preferred to select the different optically active flexible units so that they have the same polarity (positive or negative) of spontaneous polarization in order to provide a chiral smectic polymer liquid crystal having a further improved responsiveness. It is further possible to control the temperature and viscosity of the chiral smectic phase by appropriately selecting the flexible chains.

More specifically, examples of the flexible chain unit inclusive of the bonding group free from an optically active group may include: linear or branched polyalkylene, polyoxyalkylene, polysiloxane, polyester, polyfluoroalkylene, polyfluorooxyalkylene and polycarbonate. Specific examples of such flexible chain unit (inclusive of bonding group) may include the following:

The present invention provides a chiral smectic polymer liquid crystal by selecting and combining a mesogen unit and an optically active flexible chain group from those described above so as to provide a chiral smectic phase and include at least two different optically active groups resulting in mutually reverse helical rotations, whereby a chiral smectic polymer liquid crys- -continued

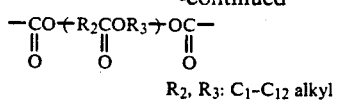

$R_2, R_3: C_1-C_{12}$ alkyl

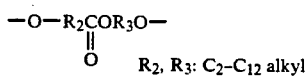

$R_2, R_3: C_2-C_{12}$ alkyl

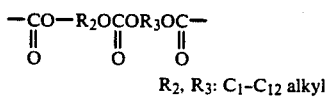

$R_2, R_3: C_1-C_{12}$ alkyl

Specific examples of the recurring unit including an optically active group may be those enumerated below: As shown at (A) below, the recurring unit per se can assume a copolymer structure which includes an optically active group-containing unit of —X—M—X—R— and also an optically active group-free unit such as —X—M—X—R'— (wherein R' denoted an optically inactive flexible chain group having a length equal to or longer than 1,4-butylene group).

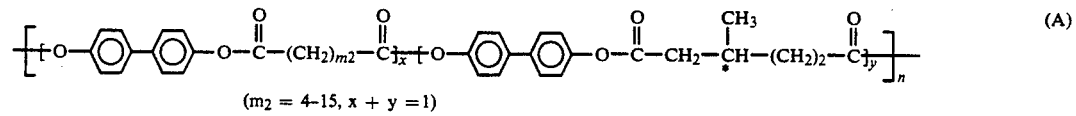
($m_2 = 4$–$15$, $x + y = 1$)

(A)

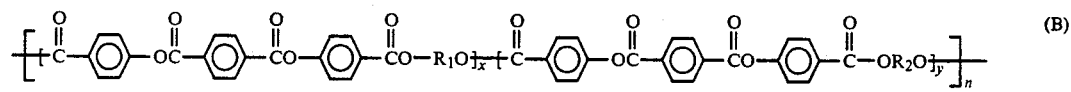

(B)

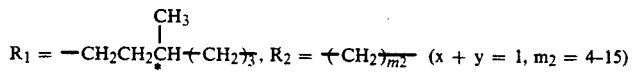

$R_1 = -CH_2CH_2\overset{*}{C}H\!-\!\!(CH_2)_3$, $R_2 = -(CH_2)_{\overline{m_2}}-$  ($x + y = 1$, $m_2 = 4$–$15$)

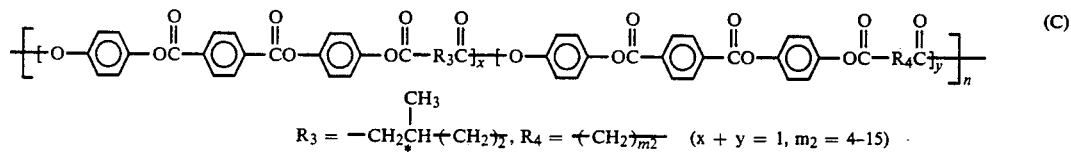

(C)

$R_3 = -CH_2\overset{*}{C}H-(CH_2)_2$, $R_4 = -(CH_2)_{\overline{m_2}}-$  ($x + y = 1$, $m_2 = 4$–$15$)

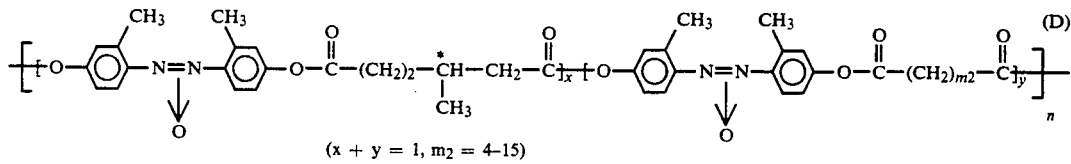
($x + y = 1$, $m_2 = 4$–$15$)

(D)

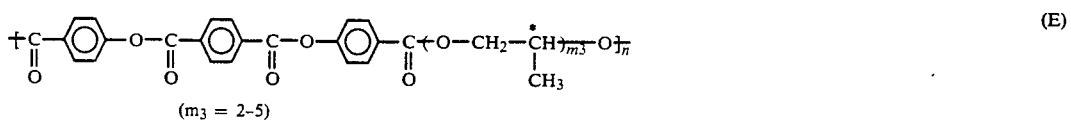
($m_3 = 2$–$5$)

(E)

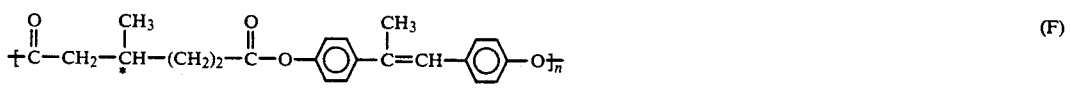

(F)

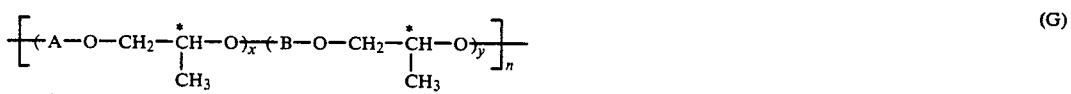

(G)

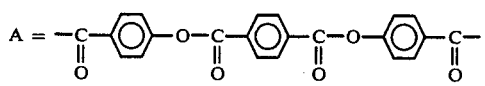

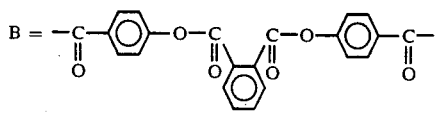

($x + y = 1$)

-continued
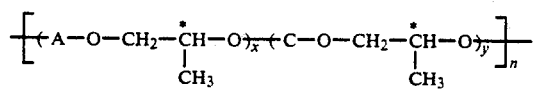 (H)
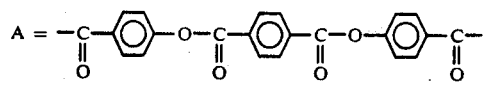
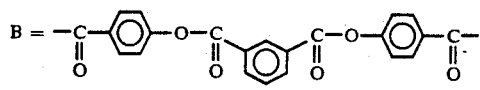
(x + y = 1)
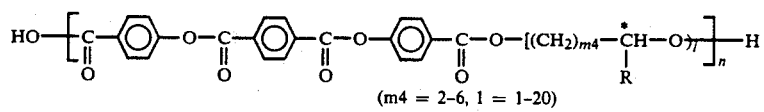 (I)
(m4 = 2-6, l = 1-20)
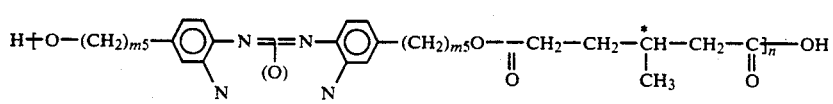 (J)
(m5 = 0-15)
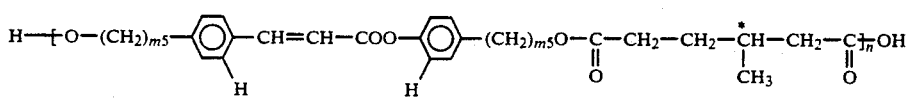 (K)
(m5 = 0-5)
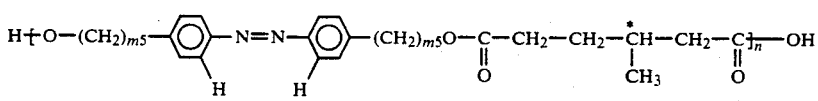 (L)
(m5 = 0-5)
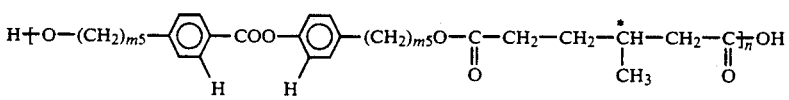 (M)
(m5 = 0-5)
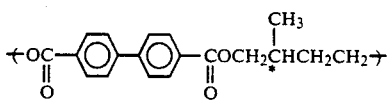 (N)
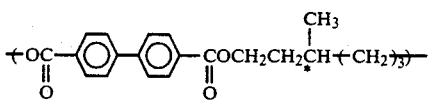 (O)
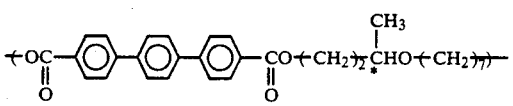 (P)
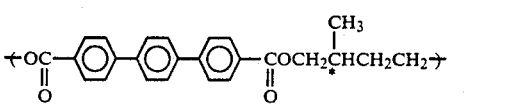 (Q)
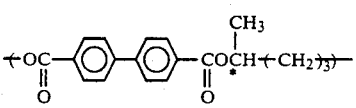 (R)

The chiral smectic polymer liquid crystal according to the present invention may comprise a mixture of two or more main chain-type mesomorphic polymers having mutually different optically active groups or a main chain-type mesomorphic copolymer having at least two different optically active groups. The mesomorphic copolymer may be in the form of a block copolymer, an alternate copolymer or a random copolymer and is preferred than a mixture of mesomorphic polymers because of better compatibility.

In the chiral smectic polymer liquid crystal of the present invention, the content of a recurring unit containing one of the at least two different optically active groups may be in the range of 1–99 mol. %, preferably 10–90 mol. %. Below 1 mol. % or above 99 mol. %, the effect of elongation of the helical pitch can be hardly attained.

It is possible to blend a low-molecular weight liquid crystal or mesomorphic compound with the chiral smectic polymer liquid crystal according to the present invention. By such blending of a low-molecular weight liquid crystal, it is possible to decrease minute defects formed by stretching alignment. For that purpose, it is desired to mix a low-molecular weight chiral smectic liquid crystal having a spontaneous polarization of the same polarity as the chiral smectic polymer liquid crystal of the invention. The low-molecular weight liquid crystal may preferably mixed in a proportion of o1–30 wt.%, further preferably be 2–20 wt.% of the resultant composition. Below 1 wt.%, the effect of addition is not sufficient. Above 30 wt.%, a considerable decrease in strength can result.

Hereinbelow, some example of the low-molecular weight liquid crystal used for that purpose are enumerated.

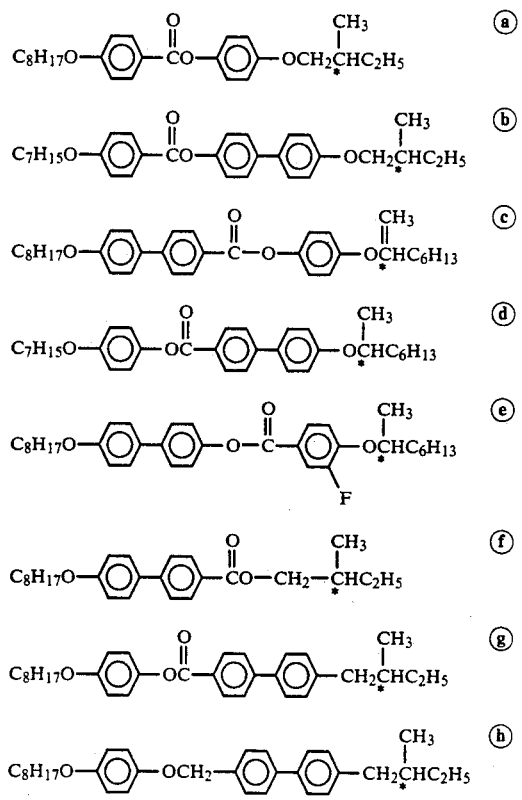

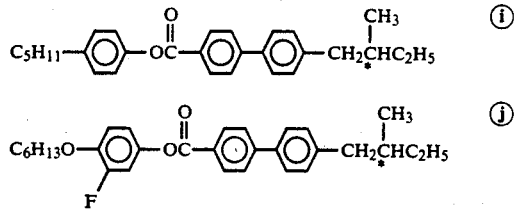

The chiral smectic polymer liquid crystal according to the present invention may be easily formed into a film by ordinary method, such as application of a solution, melt-extrusion or roller coating.

In the present invention, the thus obtained polymer liquid crystal can be aligned by stretching. In the stretching, the polymer liquid crystal in the form of a film can be stretched alone. Alternatively, it is possible to co-stretch a laminate of the polymer liquid crystal on a substrate. By such co-stretching, the substrate and the polymer liquid crystal are aligned in the same direction, whereby the substrate is expected to function as a kind of alignment layer.

In the present invention, such a polymer liquid crystal subjected to stretching on a substrate may be coated with a second substrate under pressure to form a liquid crystal device. Alternatively, the polymer liquid crystal may be sandwiched between a pair of substrates and then the resultant laminate may be stretched so as to provide a further mechanical stability.

The substrate used in the present invention is required to be a stretchable substrate, such as a plastic sheet, if the substrate is also stretched for alignment, but can be of any conventional material if the substrate is not stretched.

In the present invention, the formation of a polymer liquid crystal layer on a substrate can be effected by any of known methods.

For example, the polymer liquid crystal may be melted under heating into a relatively fluid state such as nematic phase or isotropic liquid and then applied on a substrate. The application or coating method adopted in this step may preferably be, e.g., blade coating, knife coating or extrusion coating, in view of the viscosity of the polymer liquid crystal and application of a strong shearing force for effective alignment in a subsequent stretching step.

On the other hand, it is also possible to dissolve or disperse the polymer liquid crystal in an appropriate solvent apply the resultant coating liquid on a substrate and then evaporate the solvent to form a layer of the polymer liquid crystal on the substrate. In this case, the viscosity of the polymer liquid crystal solution can be controlled by changing the concentration of the polymer liquid crystal in the solution, so that a larger number of application methods can be used than in the above-described case of heated polymer liquid crystal. In this case, however, the alignment of the polymer liquid crystal is not attained after the removal of the solvent, so that an alignment should be provided by stretching thereafter.

An appropriate application method may be adopted as the case may be. In addition to those described above, the polymer liquid crystal can be hot-pressed for lamination onto the substrate as by compression molding or formed into a sheet or film by T-die extrusion, co-extrusion, etc.

On the other hand, the stretching of the polymer liquid crystal or a laminate of the polymer liquid crystal on a substrate may be effected by any of known methods for stretching of polymers, including, e.g., uniaxial stretching (free width or constant width), successive biaxial stretching and simultaneous biaxial stretching. Among these, the uniaxial stretching provides the polymer liquid crystal with the largest degree of alignment and is thus preferred. It is however possible to effect the successive biaxial stretching with remarkably different stretching ratios along the two axes which may be close to the uniaxial stretching.

The stretching ratio may be defined as $\Delta L/L \times 100$ (%) wherein L denotes the length of a sample before stretching and $\Delta L$ denotes the difference in length between after and before the stretching. In the present invention, the stretching ratio may be 10–15,000%, preferably 20–1500%, further preferably 100–800%.

More specifically, for the stretching, known uniaxial or biaxial stretching machines, stretching rollers and inflation apparatus can be used. In addition, uniaxial stretching can also be effected by passing a polymer liquid crystal sample through two pairs of rollers rotating at different circumferential speeds. Further, zone stretching or stretching under microwave heating can also be applied.

The stretching is generally effected at a temperature above the glass transition temperature of the polymer liquid crystal layer. When the polymer liquid crystal is stretched at a temperature above the liquid crystal-isotropic phase transition temperature, the polymer main chain is stretched and then the liquid crystal skeleton is aligned while it is gradually cooled and held in the liquid crystal phase temperature region. Further, when the stretching is effected in the liquid crystal phase temperature region, a uniform alignment becomes possible so that a better result can be attained. The alignment state of the polymer liquid crystal aligned in this manner can be fixed by cooling to below the glass transition point.

In this invention, it is also possible to supplement the alignment due to stretching by applying an electric field or magnetic field during the stretching.

On the other hand, depending on a particular polymer liquid crystal used, so-called cold stretching, i.e., stretching at or below the glass transition point can be preferred in view of a high alignment effect.

After the above alignment, an electrode, preferably a transparent one such as ITO electrode, may be disposed on at least one surface of the thus obtained chiral smectic polymer liquid crystal film to provide a polymer liquid crystal device according to the present invention, in which the polymer liquid crystal according to the present invention may form a layer having a wide range of thickness of, e.g., 0.05–100 microns, preferably 0.1–20 microns because of its good thin film-formability and elongated helical pitch.

Hereinbelow, the present invention will be described in further detail based on Examples.

EXAMPLE 1

Several chiral smectic mesomorphic copolymers having the following two recurring units (I) and (II) in different ratios were prepared by polycondensation through ester exchange of the corresponding dicarboxylic acid diester with the corresponding diols in different ratios.

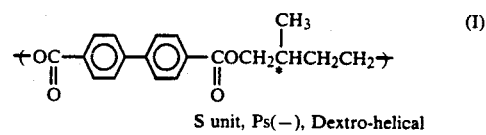

S unit, Ps(−), Dextro-helical

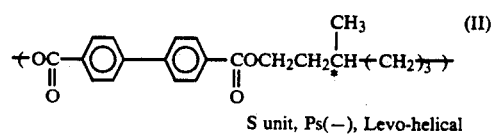

S unit, Ps(−), Levo-helical

More specifically, dimethyl diphenyldicarboxylate

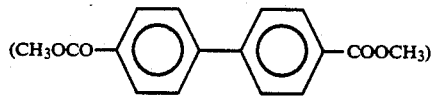

and a totally equal mole of a mixture of the following two optically active diols in different ratios were mixed each other in a molten state and reacted at about 150° C. in the presence of Ti(OBu)4 Bu: butyl as a catalyst.

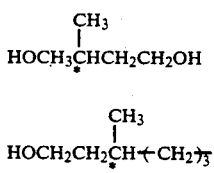

Then, the system was gradually raised in temperature and lowered in pressure to 200°–230° C. and 0.1 mmHg.abs. and the reaction was continued under these conditions for 2–3 hours while distilling off CH3OH, whereby the polycondensation was completed.

The helical pitches of the resultant chiral smectic mesomorphic copolymers as measured through polarizing microscopic observation are shown in FIG. 2. As shown in FIG. 2, mesomorphic copolymers containing 30–40 mol. % of the unit (I) showed a helical pitch of substantially infinity (i.e. no helical pitch was observed).

Among them, a mesomorphic copolymer containing 40 mol. % of the unit (I) showed the following phase transition series and weight-average molecular weight Mw (calculated as corresponding to that of polystyrene through measurement by GPC (gel permeation chromatography).

(SmC*: chiral smectic C phase, SmA: smectic A phase, Iso.: isotropic phase).

(SmC*: chiral smectic C phase, SmA: smectic A phase, Iso.: isotropic phase).

Mw=26000.

The above polymer liquid crystal was dissolved in chloroform and then cast and dried to form a 10 micron-thick film. The film was uniaxially stretched at 150° C. and a ratio of 300% and sandwiched between a pair of glass plates, each having an ITO electrode thereon and coated with a polyimide film, under heating and pressure so as to provide a thickness of about 2 microns, followed by gradual cooling to obtain a polymer liquid crystal device with a good alignment.

The polymer liquid crystal device responded in about 20 msec. on application an electric field of 20 V/micron.

EXAMPLE 2

Several chiral smectic mesomorphic copolymers having the following two recurring units (III) and (IV) in different ratios were prepared similarly as in Example by polycondensation through ester exchange of the corresponding dicarboxylic acid diester with the corresponding diols in different ratios.

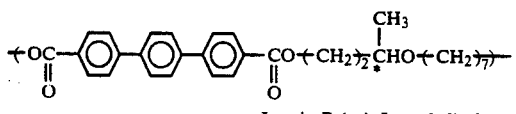

L unit, Ps(+), Levo-helical

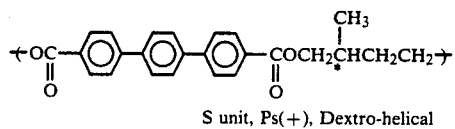

S unit, Ps(+), Dextro-helical

This series of mesomorphic copolymers showed a helical pitch of substantial infinity at a content of unit (IV) of 30–40 mol. %.

The polymer liquid crystal having a unit (IV) content of about 40 mol. % was hot-pressed between a pair of polytetrafluoroethylene films to form a 20 microns-thick film, which was then stretched at 200° C. between rollers and sandwiched between a pair of glass substrates, each having an ITO electrode thereon and coated with a polyimide alignment film, under heating and pressure so as to provide a thickness of about 10 microns, followed by gradual cooling to obtain a polymer liquid crystal device with a good alignment.

The polymer liquid crystal device responded in about 60 msec on application of an electric field of 10 V/micron.

COMPARATIVE EXAMPLE 1

A mesomorphic copolymer having the following two recurring units in a mol ratio of 0.5:0.5 was prepared similarly as in Example 1 by polycondensation through ester exchange of the corresponding dicarboxylic diester with the corresponding diols in the above-mentioned mol ratio of 0.5:0.5.

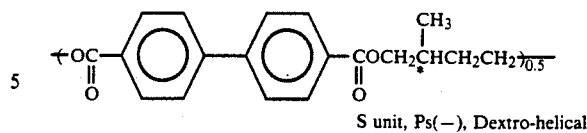

S unit, Ps(−), Dextro-helical

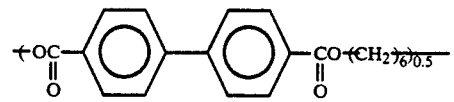

The resultant mesomorphic copolymer showed the following physical properties.

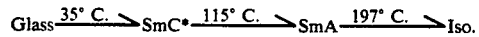

Mw=25,000

Helical pitch=0.3 micron.

The above polymer liquid crystal was cast into a 10 micron-thick film, which was then uniaxially stretched at 150° C. and sandwiched between a pair of glass plates, each having an ITO electrode and coated with a polyimide film, under heating and pressure so as to provide a thickness of about 2 microns, followed by gradual cooling, whereby an alignment with multi-domains was obtained. Among them, a relatively large domain was supplied with an electric field of 20 V/micron, whereby a response time of about 500 msec was attained.

EXAMPLE 3

The liquid crystal mesomorphic copolymer having a unit (I) content of 40 mol. % prepared in Example 1 was dissolved in chloroform to form a solution at a concentration of 20 wt. %. The solution was cast and dried to form a 20 micron-thick film, which was then uniaxially stretched at a ratio of 200% at 150° C. The resultant 10 micron-thick and 2 cm-wide film was subjected to a tensile stress of 10 g/cm-width, whereby no elongation or breakage was observed but a good strength was shown.

EXAMPLES 4–6

Three mesomorphic copolymers having the following two recurring units (II) and (V) in different ratios as described in Table 1 appearing hereinafter were prepared by polycondensation through ester exchange of the corresponding dicarboxylic acid ester with the corresponding diols in the corresponding ratios.

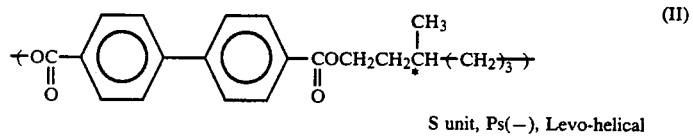

S unit, Ps(−), Levo-helical

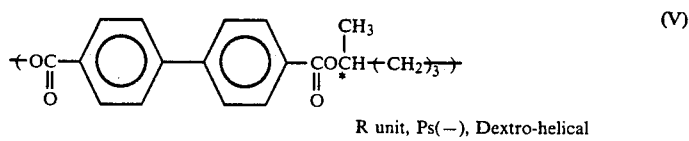

R unit, Ps(−), Dextro-helical

The resultant mesomorphic copolymers were respectively dissolved in chloroform, cast into a 15 micron-thick film and then uniaxially stretched at a ratio of 300%. Each stretched film was sandwiched between a pair of glass substrates each having thereon an ITO electrode so as to form an about 6 micron-thick layer.

The thus formed three polymer liquid crystal devices were respectively subjected to a response test in SmC* phase under application of electric fields of ±20 V/micron. The measured data of the response time for the respective devices are also described in Table 1 appearing hereinafter together with helical pitch data of the mesomorphic copolymers.

COMPARATIVE EXAMPLES 2 AND 3

A mesomorphic polymer having the recurring unit (II) alone and A mesomorphic polymer having the recurring unit (V) alone were prepared by polycondensation through ester exchange of the dicarboxylic acid ester with the corresponding diol.

The resultant mesomorphic polymers were respectively formed into a polymer liquid crystal in the same manner as in Examples 4-6 and subjected to measurement of the response time.

The results are also shown in the following Table 1.

TABLE 1

|  | Unit II (mol. %) | Unit V (mol. %) | Response time (msec) | Helical pitch (μm) |
| --- | --- | --- | --- | --- |
| Comp. Example 2 | 0 | 100 | 400 | 0.2 |
| Example 4 | 50 | 50 | 100 | 0.5 |
| Example 5 | 72 | 28 | 15 | 3 |
| Example 6 | 90 | 10 | 600 | 0.4 |
| Comp. Example 3 | 100 | 0 | No response | — |

COMPARATIVE EXAMPLE 4

A vinyl monomer of the following structural formula was subjected to radical polymerization in toluene under $N_2$ stream at 60° C. in the presence of AIBN as the initiator.

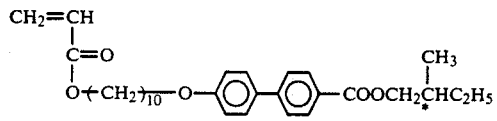

The resultant polymer was re-precipitated from methanol and dried. The polymer showed SmC* phase in the range of 40-50° C. in the course of cooling.

The side chain-type chiral smectic polymer liquid crystal was dissolved in chloroform at a concentration of 20 wt. %, and the solution was cast into a film in dry thickness of 20 microns. The cast film was then tried to be peeled from the glass substrate but was cut during the peeling, thus failing to provide a good film.

Then, the above chloroform solution of the polymer was cast onto a 10 micron-thick PVA film to form a 30 micron-thick laminate film, which was then uniaxially stretched at a ratio of 200% at 80° C. The PVA film was then dissolved with water to leave an 8 micron-thick and 1.8 cm-wide mesomorphic polymer film. When the film was subjected to a tensile stretch of 1 g/cm-width, it was cut off.

EXAMPLE 7

Two mesomorphic polymers having the following recurring units (I) and (II) respectively were prepared by polycondensation through ester exchange of the corresponding dicarboxylic acid diester with the corresponding optical active diols.

The respective mesomorphic polymers thus obtained are shown below with their recurring unit and physical properties:

Polymer (I):

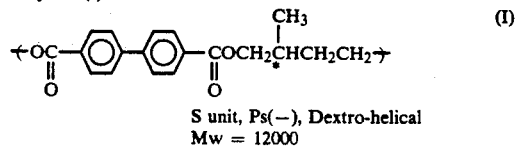

S unit, Ps(−), Dextro-helical
Mw = 12000

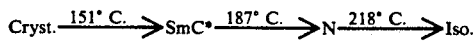

Polymer (II):

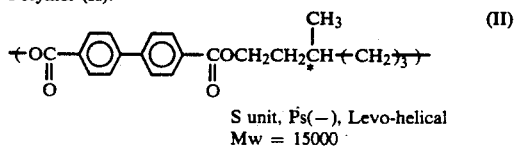

S unit, Ps(−), Levo-helical
Mw = 15000

The above-prepared mesomorphic polymers were respectively dissolved in chloroform. The resultant two solutions were mixed with each other in different ratios, and the resultant mixture solutions were respectively cast and dried to obtain polymer liquid crystal compositions in the form of films. As a result of microscopic observation in SmC* phase, these compositions showed a helical pitch of almost infinity at a unit (I) content of 35-45 mol. %.

A chloroform solution of a polymer liquid crystal mixture prepared as described above having a unit (I) content of about 40 mol. % was applied onto a 10 micron-thick PVA film by bar-coating and dried to form a 15 micron-thick laminate film. The laminate film was then uniaxially stretched at 170° C. and a ratio of 300%, and the 6 micron-thick stretched film was sandwiched between a pair of glass plates each provided with an ITO electrode to form a polymer liquid crystal device. The device responded in about 30 msec on application of an electric field of 20 V/micron.

EXAMPLE 8

A mesomorphic copolymer containing the following recurring units (I), (II) and (VI) in proportions of 35 mol. %, 45 mol. % and 20 mol. %, respectively, was prepared by polycondensation through ester exchange of the corresponding dicarboxylic acid diester with the corresponding three diols.

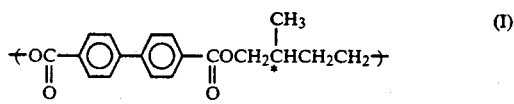

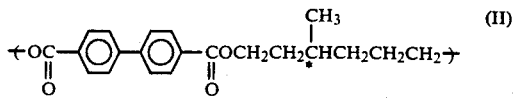

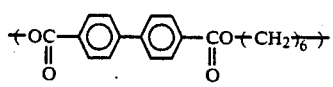 (VI)

The resultant mesomorphic copolymer showed the following properties.

Mw = 28000.

The mesomorphic copolymer was dissolved in chloroform and cast onto a 10 micron-thick PVA film, followed by drying, to obtain a 15 micron-thick laminate film, which was then uniaxially stretched at 150° C. and a ratio of 300%. The stretched 7 micron-thick laminate film was sandwiched between a pair of glass substrates each provided with an ITO film. The thus prepared polymer liquid crystal device responded in about 30 msec on application of an electric field of 20 V/micron.

COMPARATIVE EXAMPLE 5

The mesomorphic copolymer prepared in Comparative Example 1 was dissolved in chloroform at a concentrations of 20 wt. %, and the solution was cast onto a PVA film, followed by drying, to obtain a 20 micron-thick film. The film was then uniaxially stretched at a ratio of 200% at 150° C. into a thickness of 13 microns and sandwiched between a pair of substrates each provided with an ITO electrode to provide a device. The device was supplied with a DC voltage of 100 V between the substrates and cooled from 150° C. under the voltage application, whereby the birefringence axes of the polymer liquid crystal were generally aligned while with some defects. When the voltage application was terminated at 100° C., the birefringence axes were disordered in 500 msec.

EXAMPLE 9

The mesomorphic copolymer prepared in Example 1 containing 40 mol. % of the unit (I) was dissolved in chloroform at a concentration of 20 wt. %, and the solution was cast onto a PVA film, followed by drying, to obtain a 20 micron-thick film. The film was then uniaxially stretched at a ratio of 200% at 150° C. into a thickness of 10 microns and sandwiched between a pair of substrates each provided with an ITO electrode to provide a device. The device was supplied with a DC voltage of 100 V between the substrates and cooled from 150° C. under the voltage application, whereby the birefringence axes of the polymer liquid crystal were aligned. The aligned state was retained in the absence of an electric field for more than 2 days at room temperature and retained for more than 1 hour at 100° C. When a reverse electric field was applied, the birefringence axes was tilted by about 40 degrees while the other states were retained.

As described above, the polymer liquid crystal according to the polymer liquid crystal allows an easier film formation to provide a large-area film with a good strength and a good alignment.

Further, the chiral smectic polymer liquid crystal has a large spontaneous polarization and an excellent molecular alignment characteristic, so that a polymer liquid crystal device obtained by using the polymer liquid crystal is provided with a high-speed responsiveness.

What is claimed is:

1. A main chain-type chiral smectic polymer liquid crystal comprising at least two main chain-type polymer liquid crystals, each having a recurring unit represented by the following formula (I) including an optically active group but having mutually different optically active groups:

—(X—M—X—R)— wherein

M is a mesogen group having at least two cyclic groups including two terminal cyclic groups, R is an optically active flexible chain group, which is a branched chain group free from a cyclic structure and having a linear chain length not shorter than a 1,4-butylene group and in which the linear chain is composed of at least one of C, Si, O and S atoms, and X is a bonding group which is selected from the group consisting of ester, ether, thioester and carbonate groups; and the two of said at least two polymer liquid crystals show mutually reverse helical rotations in their chiral smectic phase and are mixed in a proportion providing the composition with a helical pitch which is longer than that of any of the two polymer liquid crystals.

2. A polymer liquid crystal according to claim 1, wherein said at least two polymer liquid crystals include a polymer liquid crystal having a recurring unit represented by the following formula (II):

 (II)

wherein M and R have the same meanings as in the formula (I).

3. A polymer liquid crystal according to claim 1, wherein the M in the formula (I) denotes any one of the following groups 1-28:

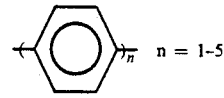

1

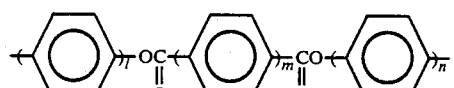

2 l, m, n = 1-3
l + m + n ≦ 5

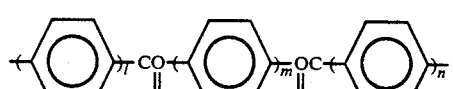

3 l, m, n = 1-3
l + m + n ≦ 5

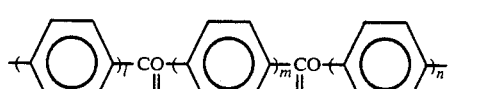

4 l, m, n = 1-3
l + m + n ≦ 5

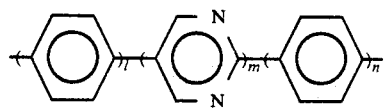
m = 1-2
l, n = 0-2
1 ≦ l + n ≦ 4
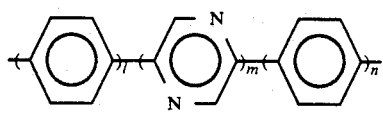
m = 1-2
l, n = 0-2
1 ≦ l + n ≦ 4
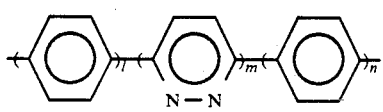
m = 1-2
l, n = 0-2
1 ≦ l + n ≦ 4
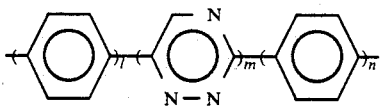
m = 1-2
l, n = 0-2
1 ≦ l + n ≦ 4
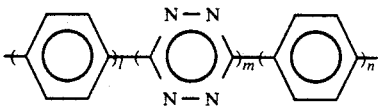
m = 1-2
l, n = 0-2
1 ≦ l + n ≦ 4
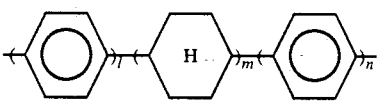
m = 1-3
l, n = 0-2
1 ≦ l + n ≦ 4
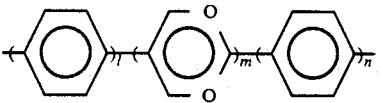
m = 1-2
l, n = 0-2
1 ≦ l + n ≦ 4
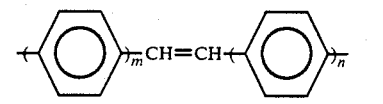
m,n = 0-3
2 ≦ m + n ≦ 4
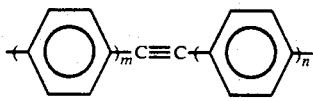
m,n = 0-3
2 ≦ m + n ≦ 4
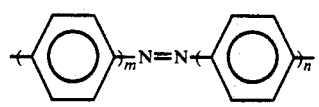
m,n = 1-2
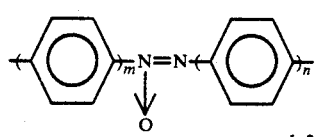
m,n = 1-2
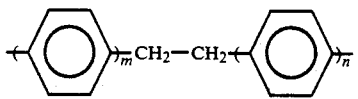
m,n = 1-2
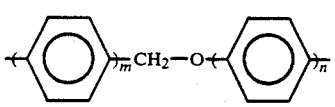
m,n = 1-2
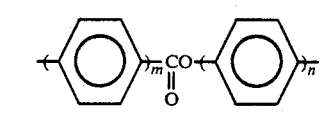
m,n = 1-3
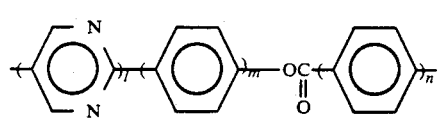
n,l = 1-2
m = 0-2
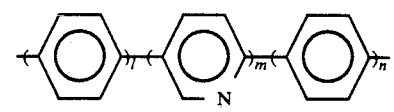
l, n = 0-2
m = 1-2
2 ≦ l + n ≦ 5
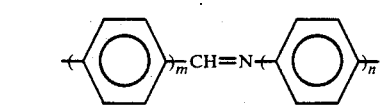
m,n = 1-2

-continued

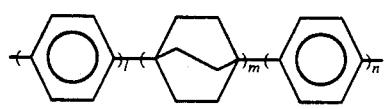

l, n = 0–2
m = 1–2
2 ≦ l + n ≦ 5

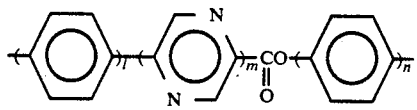

n, m = 1–2
l = 1–2

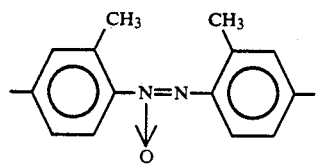

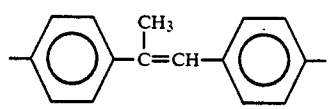

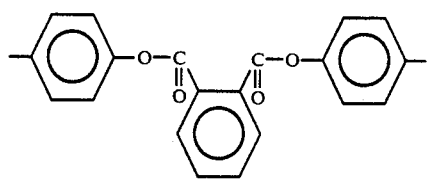

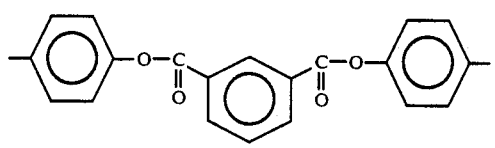

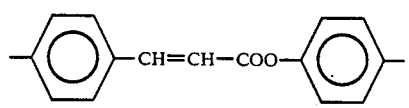

4. A polymer liquid crystal according to claim 1, wherein R in the formula (I) is any one of the following groups (1)–(17):

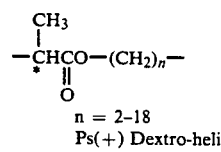   (1)

n = 2–18
Ps(+) Dextro-helical

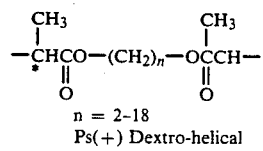   (2)

n = 2–18
Ps(+) Dextro-helical

-continued

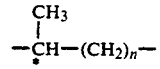   (3)

N = 3–18
Ps(+) Levo-helical

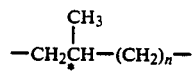   (4)

n = 2–18
Ps(−) Dextro-helical

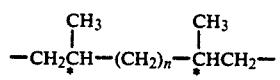   (5)

n = 2–18
Ps(−) Dextro-helical

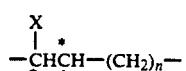   (6)

n = 2–18
X = Cl, F, Br
Ps(−) Dextro-helical

   (7)

n = 2–18
X = Cl, F, Br
Ps(−) Dextro-helical

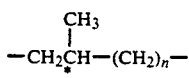   (8)

n = 2–18
Ps(−) Levo-helical

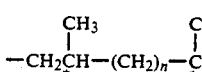   (9)

n = 2–18
Ps(−) Levo-helical

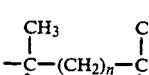   (10)

n = 3–18
Ps(−) Levo-helical

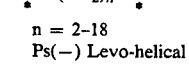   (11)

n = 2–18
Ps(−) Levo-helical

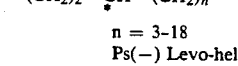   (12)

n = 3–18
Ps(−) Levo-helical

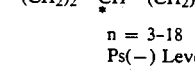   (13)

n = 3–18
Ps(−) Levo-helical

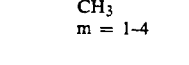   (14)

m = 1–4

-continued

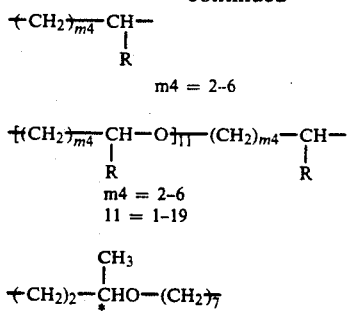

5. A polymer liquid crystal according to claim 1, wherein one of said at least two polymer liquid crystals is present in a proportion of 1-99 mol%.

6. A polymer liquid crystal according to claim 1, wherein said at least two units having mutually different optically active groups show the same polarity of spontaneous polarization.

7. A polymer liquid crystal device comprising a film of a chiral smectic polymer liquid crystal according to claim 1 and an electrode disposed on at least one side of the film.

8. A device according to claim 7, wherein the film has been subjected to an aligning treatment.

9. A main chain-type chiral smectic polymer liquid crystal comprising a copolymer-type polymer liquid crystal comprising a main chain including at least two types of recurring units each represented by the following formula (I) including an optically active group but having mutually different optically active groups:

$$+X-M-X-R+ \quad (I),$$

wherein M is a mesogen group having at least two cyclic groups including two terminal cyclic groups, R is an optically active flexible chain group which is a branched chain group free from a cyclic structure and having a linear chain length not shorter than 1,4-butylene group and in which the linear chain is composed of at least one of C, Si, O and S atoms, and X is a bonding group which is selected from the group consisting of ester, ether, thioester and carbonate groups; and the two of said at least two types of recurring units show mutually reverse helical rotations in their chiral smectic phase.

10. A polymer liquid crystal according to claim 9, wherein said at least two recurring units include one represented by the following formula (II):

$$+OC-M-CO-R+, \quad (II)$$

wherein M and R have the same meanings as in the formula (I).

11. A polymer liquid crystal according to claim 9, wherein the M in the formula (I) is any one of the following groups 1-28:

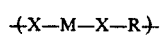 n = 1-5    1

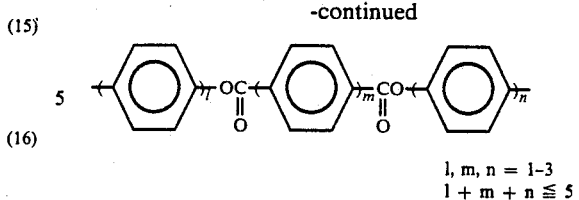 2 l, m, n = 1-3
l + m + n ≦ 5

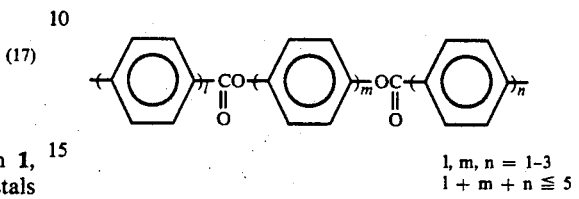 3 l, m, n = 1-3
l + m + n ≦ 5

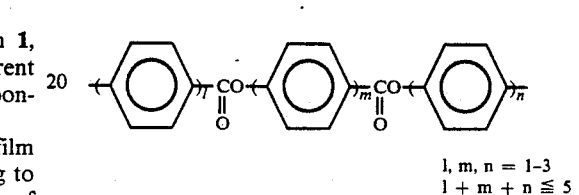 4 l, m, n = 1-3
l + m + n ≦ 5

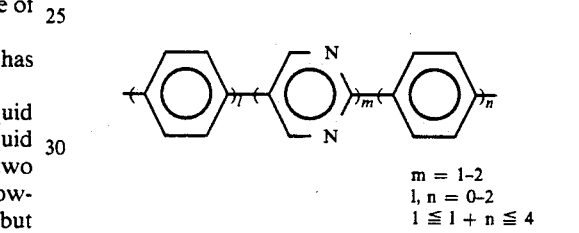 5 m = 1-2
l, n = 0-2
1 ≦ l + n ≦ 4

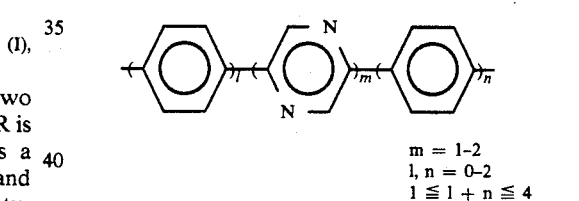 6 m = 1-2
l, n = 0-2
1 ≦ l + n ≦ 4

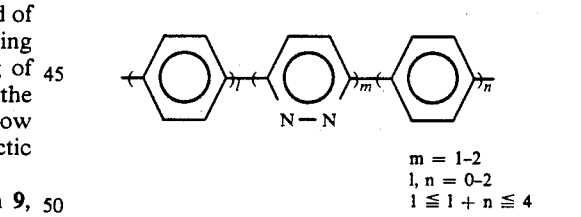 7 m = 1-2
l, n = 0-2
1 ≦ l + n ≦ 4

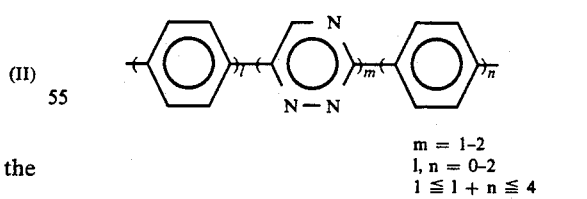 8 m = 1-2
l, n = 0-2
1 ≦ l + n ≦ 4

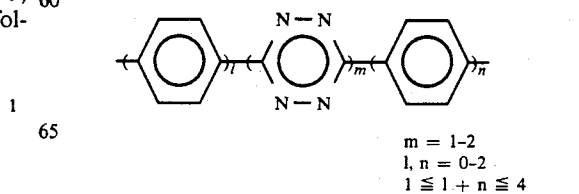 9 m = 1-2
l, n = 0-2
1 ≦ l + n ≦ 4

-continued
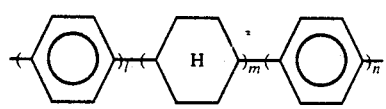
m = 1–3
l, n = 0–2
1 ≦ l + n ≦ 4
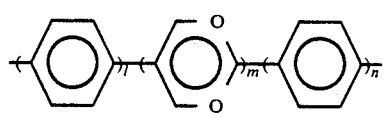
m = 1–2
l, n = 0–2
1 ≦ l + n ≦ 4
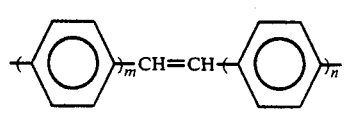
m, n = 0–3
2 ≦ m + n ≦ 4
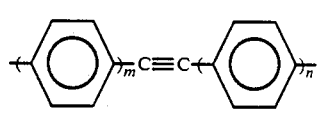
m, n = 0–3
2 ≦ m + n ≦ 4
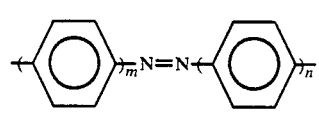
m, n = 1–2
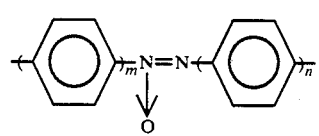
m, n = 1–2
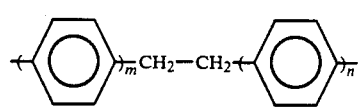
m, n = 1–2
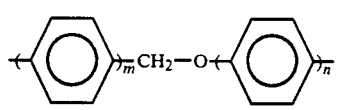
m, n = 1–2
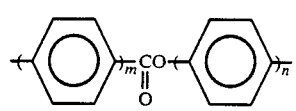
m, n = 1–3
-continued
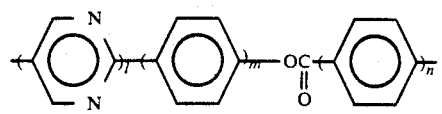
n, l = 1–2
m = 0–2
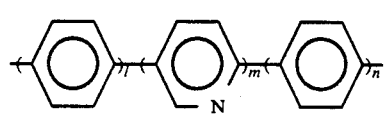
l, n = 0–2
m = 1–2
2 ≦ l + n ≦ 5
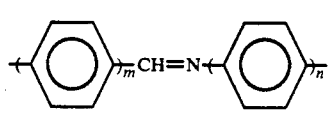
m, n = 1–2
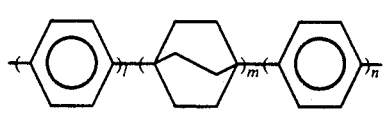
l, n = 0–2
m = 1–2
2 ≦ l + n ≦ 5
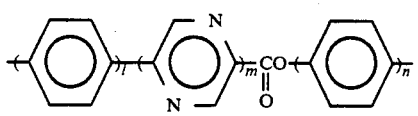
n, m = 1–2
l = 1–2
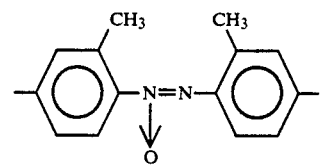
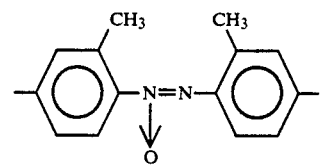
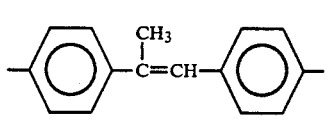
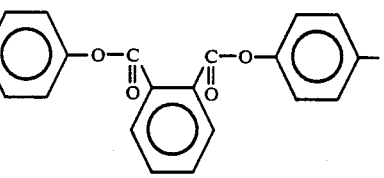
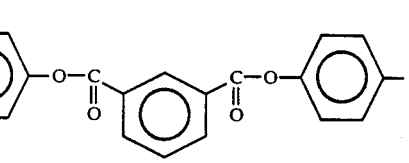

-continued

(28) 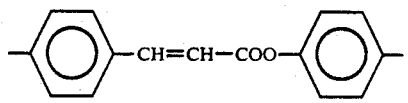

12. A polymer liquid crystal according to claim 9, wherein R in the formula (I) is any one of the following groups (1)–(17):

(1) 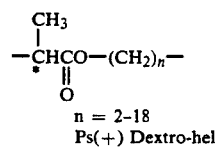
n = 2–18
Ps(+) Dextro-helical (2) 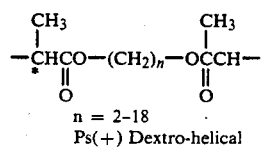
n = 2–18
Ps(+) Dextro-helical (3) 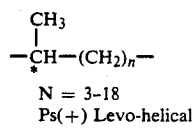
N = 3–18
Ps(+) Levo-helical (4) 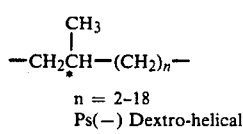
n = 2–18
Ps(−) Dextro-helical (5) 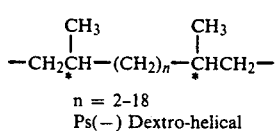
n = 2–18
Ps(−) Dextro-helical (6) 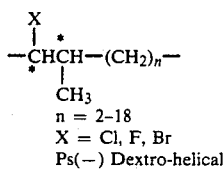
n = 2–18
X = Cl, F, Br
Ps(−) Dextro-helical (7) 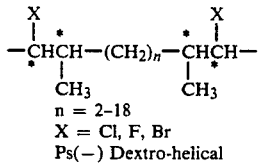
n = 2–18
X = Cl, F, Br
Ps(−) Dextro-helical (8) 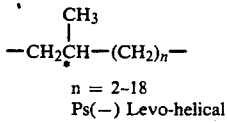
n = 2–18
Ps(−) Levo-helical -continued (9) 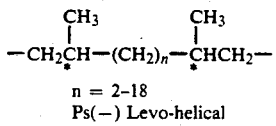
n = 2–18
Ps(−) Levo-helical

(10) 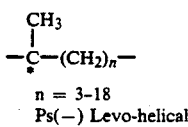
n = 3–18
Ps(−) Levo-helical

(11) 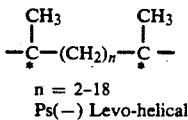
n = 2–18
Ps(−) Levo-helical

(12) 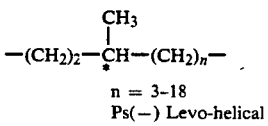
n = 3–18
Ps(−) Levo-helical

(13) 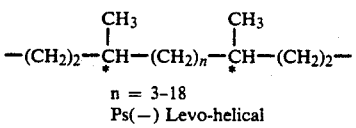
n = 3–18
Ps(−) Levo-helical

(14) 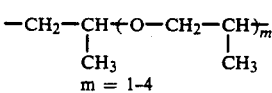
m = 1–4

(15) 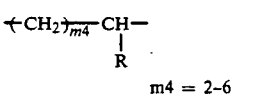
m4 = 2–6

(16) 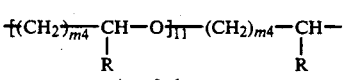
m4 = 2–6
l1 = 1–19

(17) 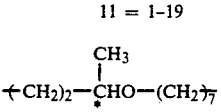

13. A polymer liquid crystal according to claim 9, wherein one of the said at least two types of recurring units is present in a proportion of 1–99 mol%.

14. A polymer liquid crystal according to claim 9, wherein aid at least two units having naturally different optically active groups show the same polarity of spontaneous polarization.

15. A polymer liquid crystal device comprising a film of a chiral smectic polymer liquid crystal according to claim 9 and an electrode disposed on at least one side of the film.

16. A device according to claim 15, wherein the film has been subjected to an aligning treatment.

* * * * *

UNITED STATES PATENT AND TRADEMARK OFFICE
CERTIFICATE OF CORRECTION

PATENT NO. : 5,258,134
DATED : November 2, 1993
INVENTOR(S) : KAZUO YOSHINAGA, ET AL.

Page 1 of 6

It is certified that error appears in the above-identified patent and that said Letters Patent is hereby corrected as shown below:

COLUMN 1

Line 41, "899-" should read --899-901--.
Line 62, "suitably" should read --suitable--.
Line 65, "raise" should read --prepare--.
Line 67, "p.p." should read --pp.--.

COLUMN 3

Line 17, "view" should read --views--.
Line 53, "chain" should read --chain 4--.

COLUMN 4

Line 64, "groups" should read --group--.

COLUMN 6

Example 3, " $-\underset{\underset{O}{\|}}{C}O-$ " should read -- $-\underset{\underset{O}{\|}}{C}O-$ -- and " $-\underset{\underset{O}{\|}}{O}C-$ " should read -- $-\underset{\underset{O}{\|}}{O}C-$ --.

Example 4, " $-\underset{\underset{O}{\|}}{C}O-$ " should read -- $-\underset{\underset{O}{\|}}{C}O-$ --

UNITED STATES PATENT AND TRADEMARK OFFICE
CERTIFICATE OF CORRECTION

PATENT NO. : 5,258,134

DATED : November 2, 1993

INVENTOR(S) : KAZUO YOSHINAGA, ET AL.

It is certified that error appears in the above-identified patent and that said Letters Patent is hereby corrected as shown below:

COLUMN 6

Example 5, "l, n = 1-2
           l, n = 0-2" should read --l, n = 0-2--.

COLUMN 8

Example 20, "$2 \leq l + n \leq 5$" should read ----$2 \leq l + m + n \leq 5$--.
Example 22, "$2 \leq l + n \leq 5$" should read ----$2 \leq l + m + n \leq 5$--.
Example 23, "l = 1-2" should read --l = 0-2--.

COLUMN 9

Example (10), "PS" should read --Ps--.
Example (12), "$-(CH_2)-$" should read -- $-(CH_2)_n-$ --.
Example (13), "$-(CH_2)HD\ 2-$" should read -- $-(CH_2)_2-$ --.

COLUMN 10

Example 4, "$R^2$" should read --$R_2$--.
Example 9, "fLuoroalkyl" should read --fluoroalkyl--.

COLUMN 12

Line 12, "denoted" should read --denotes--.

UNITED STATES PATENT AND TRADEMARK OFFICE
CERTIFICATE OF CORRECTION

PATENT NO. : 5,258,134
DATED : November 2, 1993
INVENTOR(S) : KAZUO YOSHINAGA, ET AL.

It is certified that error appears in the above-identified patent and that said Letters Patent is hereby corrected as shown below:

COLUMN 13

Example (I), "$\overset{*}{\underset{R}{CH}}-O)_1$" should read --$\overset{*}{\underset{R}{CH}}-O)_1$--.

Example (J), "$O-\underset{\underset{O}{\|}}{\ }-CH_2$" should read --$O-\underset{\underset{O}{\|}}{C}-CH_2$-- and "(m5 - 0-15)" should read --(m5 = 0-5)--.

COLUMN 15

Line 28, "mixed" should read --be mixed-- and "ol-30" should read --1-30--.
Line 33, "example" should read --examples--.

COLUMN 16

Line 50, "solvent" should read --solvent,--.

COLUMN 17

Line 11, "dose" should read --close--.

COLUMN 18

Line 22, "mixed" should read --mixed with--.
Line 24, "Ti(OBu)4" should read --Ti(OBu)$_4$--.
Line 50, "tography)." should read --tography)).--.

UNITED STATES PATENT AND TRADEMARK OFFICE
CERTIFICATE OF CORRECTION

PATENT NO. : 5,258,134
DATED : November 2, 1993
INVENTOR(S) : KAZUO YOSHINAGA, ET AL.

It is certified that error appears in the above-identified patent and that said Letters Patent is hereby corrected as shown below:

COLUMN 19

Line 4, "application" should read --application of--.
Line 9, "Example" should read --Example 1--.

COLUMN 21

Line 14, "A" should read --a--.

COLUMN 23

Line 58, "was" should read --were--.
Line 61, "polymer liquid crystal" should read --invention--.

COLUMN 24

Line 9, "--(X—M—X—R)--" should read -- --(X—M—X—R)--    (I)--.

Line 34,

COLUMN 26

Group 20, "$2 \leqq 1 + n \leqq 5$" should read --$2 \leqq 1 + m + n \leqq 5$--.

COLUMN 27

Group 22, "$2 \leqq 1 + n \leqq 5$" should read --$2 \leqq 1 + m + n \leqq 5$--.
Group 23, "1 = 1-2" should read --1 = 0-2--.

UNITED STATES PATENT AND TRADEMARK OFFICE
CERTIFICATE OF CORRECTION

PATENT NO. : 5,258,134
DATED : November 2, 1993
INVENTOR(S) : KAZUO YOSHINAGA, ET AL.

It is certified that error appears in the above-identified patent and that said Letters Patent is hereby corrected as shown below:

COLUMN 27

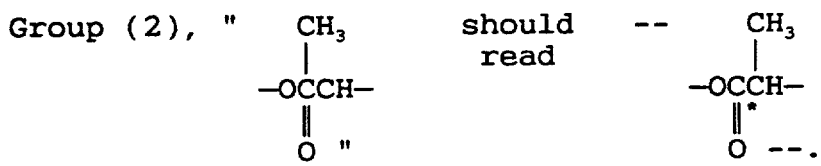

COLUMN 32

Group 20, "$2 \leq 1 + n \leq 5$" should read --$2 \leq 1 + m + n \leq 5$--.
Group 22, "$2 \leq 1 + n \leq 5$" should read --$2 \leq 1 + m + n \leq 5$--.
Group 23, "$1 = 1-2$" should read --$1 = 0-2$--.

COLUMN 33

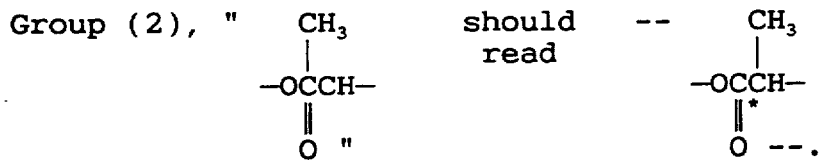

UNITED STATES PATENT AND TRADEMARK OFFICE
CERTIFICATE OF CORRECTION

PATENT NO.    :  5,258,134

DATED         :  November 2, 1993

INVENTOR(S)   :  KAZUO YOSHINAGA, ET AL.

It is certified that error appears in the above-identified patent and that said Letters Patent is hereby corrected as shown below:

COLUMN 34

Line 50, "aid" should read --said-- and "naturally" should read --mutually--.

Signed and Sealed this

Thirtieth Day of August, 1994

Attest:

BRUCE LEHMAN

Attesting Officer         Commissioner of Patents and Trademarks